June 15, 1954     K. E. PEILER     2,680,937
GLASS FEEDER SHEAR MECHANISM HAVING OVERLAP
ADJUSTING AND THROWOUT MEANS
Original Filed April 21, 1949     2 Sheets-Sheet 2
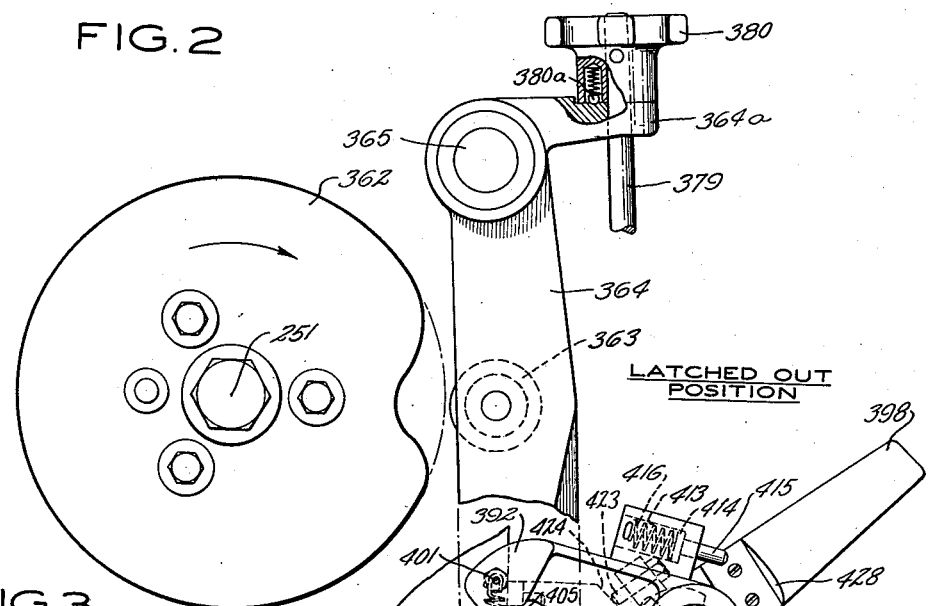
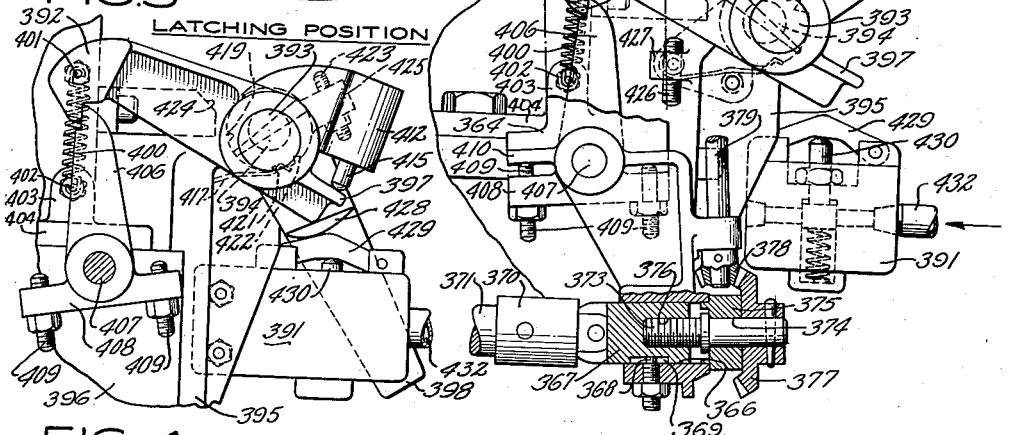
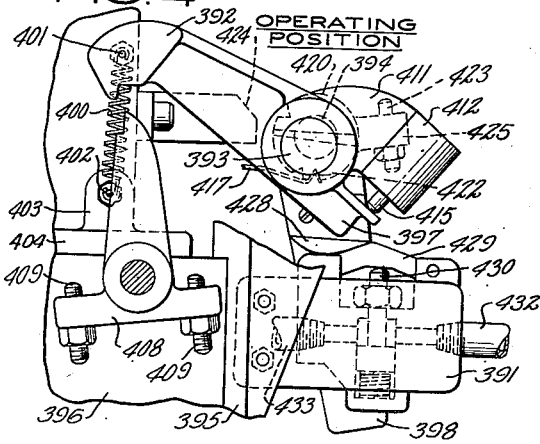
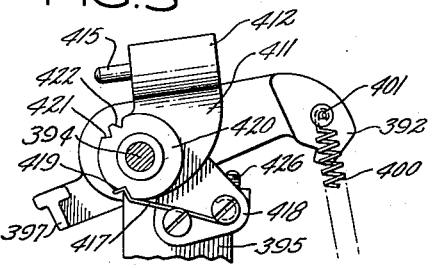
INVENTOR
KARL E. PEILER
BY Parham & Bates
ATTORNEYS Patented June 15, 1954

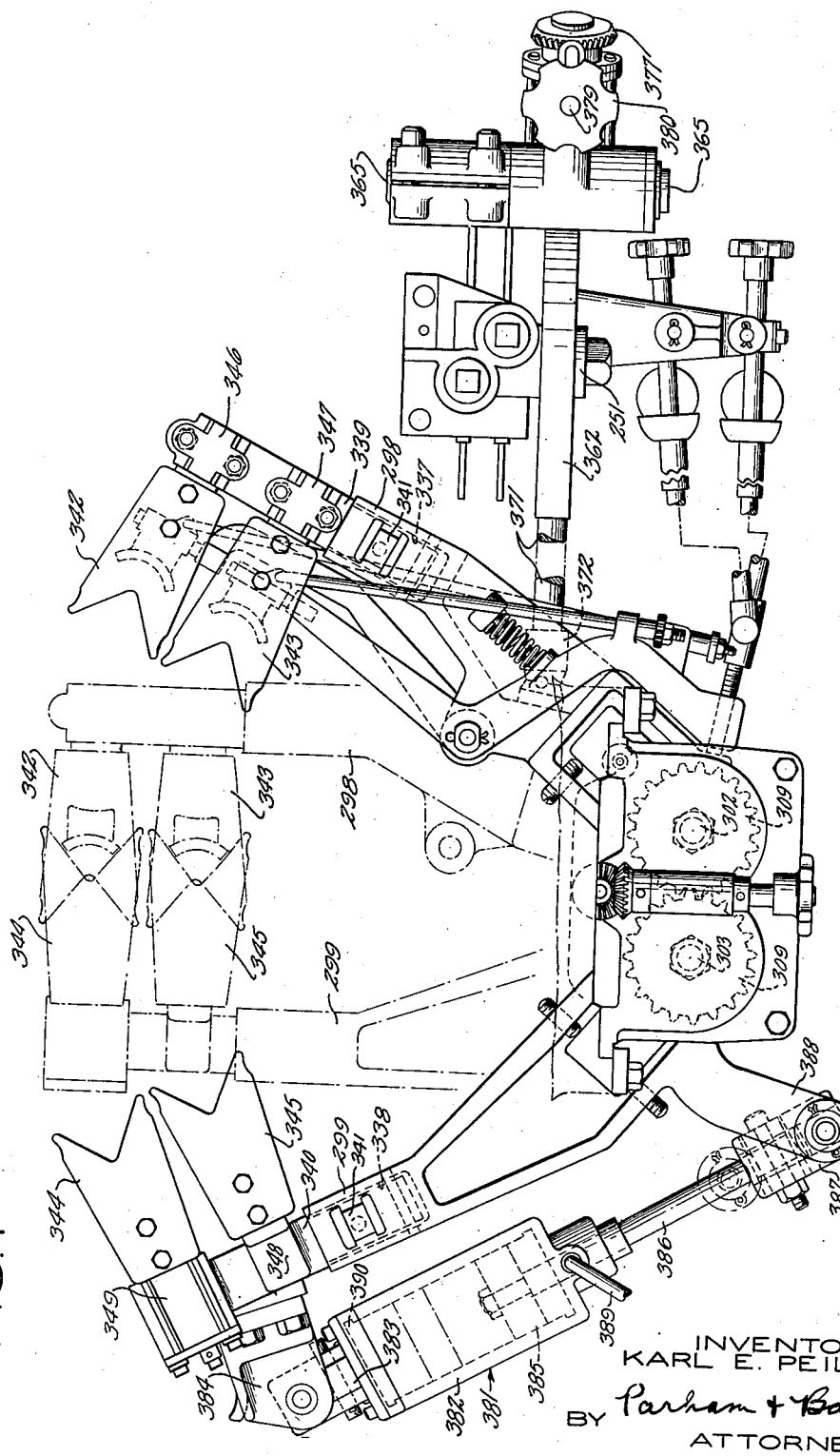

2,680,937

UNITED STATES PATENT OFFICE 2,680,937

GLASS FEEDER SHEAR MECHANISM HAVING OVERLAP ADJUSTING AND THROW-OUT MEANS

Karl E. Peiler, West Hartford, Conn., assignor to Emhart Manufacturing Company, a corporation of Delaware Original application April 21, 1949, Serial No. 88,869, now Patent No. 2,654,184, dated October 6, 1953. Divided and this application December 24, 1951, Serial No. 263,077

5 Claims. (Cl. 49—14)

This application is a division of my co-pending application, Serial No. 88,869, filed April 21, 1949, now Patent No. 2,654,184, for an improvement in glass feeding apparatus, and is filed for the purpose of claiming the invention thereof that is embodied in a shear mechanism having improved means for adjusting the overlap of the shear blades when closed and improved means for latching the shear blades out of operation when in their open or retracted positions when desired and for restoring them to operation in their former timed relation to other operating parts of the feeding apparatus.

A practical embodiment of the invention is shown in the accompanying drawings, showing the structures of Figs. 18, 24, 25, 26 and 27, respectively, of the parent application, Serial No. 88,869, now Patent No. 2,654,184 and is described in detail in the following specification, which consists of the pertinent portions of the specification of the parent case.

In the accompanying drawings:

Fig. 1 is a plan view of the shears;

Fig. 2 is a view showing the shear cam, a shear cam lever associated therewith and a shear throw-out mechanism operatively applied thereto, such throw-out mechanism being shown in position to hold the cam roller carried by the lever latched out of position for contact with the cam;

Fig. 3 is a detail of the shear cam lever throw-out mechanism in position to throw the lever out of operating position;

Fig. 4 is a view like Fig. 3 but showing the throw-out mechanism inactive during operation of the shear cam lever; and Fig. 5 is a fragmentary sectional view, showing the reverse side of the shear throw-out mechanism from that shown in Figs. 2 to 4.

The shear mechanism comprises a right hand, horizontally disposed shear arm 298 and a cooperative left hand shear arm 299, as viewed in Fig. 1. The shear arms 298 and 299 are pivotally mounted on vertical shear posts or spindles 302 and 303, respectively. When swinging movement is imparted to one of the shear arms the other will be correspondingly moved but in the opposite direction by reason of the action of co-engaging gears 399.

The shear arms 298 and 299 are provided with open ended, longitudinal ways 337 and 338, respectively, in which end portions of the outer end sections or extensions 339 and 340, respectively, of such arms slidably fit. Fastening devices 341 secure the end sections to their shear arms in adjusted positions. These end sections 339, 340 carry the cooperative upper and lower shear blades, respectively. In the feeder construction as particularly described so far, the orifice ring is provided with two orifices for feeding a pair of glass charges simultaneously and the shearing mechanism has two pairs of cooperative upper and lower blades for shearing the charges produced. The upper shear blades are indicated at 342 and 343, respectively, and their cooperative lower shear blades 344 and 345, respectively. The blades 342 and 343 are mounted by holders 346 and 347 on the right hand shear arm end section 339, both these holders being constructed and arranged in a known manner to permit individual tilting of these blades about their longitudinal medial lines. Of the lower shear blades, the front shear blads 345 which cooperates with the front upper shear blade 343, these being the shear blades nearest the hubs of the shear arms, is mounted by a holder 348 in a fixed position on the end section 340 of the left hand shear arm. The rear lower blade, 344, is mounted by a holder 349 which preferably is constructed and arranged to permit individual vertical adjustment thereof so that its tension on the cooperative rear upper blade may be preset to correspond exactly to the tension between the front blades.

The longitudinal adjustments of the end sections 339 and 340 in their shear arms provide adjustment of the points of cutting of the shear blades when they are closed as indicated by the dot-and-dash lines in Fig. 1, these being predetermined to coincide with the axial lines of the respective orifices in the bottom of the feeder orifice ring. Also, this adjustment permits selective uses of the same shear mechanism with single and double orifice feeders. Thus, either the front or rear pair of shear blades could be positioned for use to sever glass which is provided in suspension from a single feed orifice.

The closing and opening movements of the shear arms are effected by suitable motion transmitting mechanism actuated by a shear cam 362 on the cam shaft 251. The shear cam acts on a cam roller 363 carried by an intermediate portion of a shear cam roller lever 364 which is pivotally supported at its upper end on a horizontal fixed position shaft 365. The lower end of the lever 364 is provided with an opening 366 therethrough, this opening extending in a direction normal to the direction of the axis of the pivot shaft 365 and serving as a slideway for a block 367, as best seen in Fig. 2. The block 367 is permitted only limited movement longitudinally in the opening 366, such movement being limited by a pin 368 projecting from the wall of the opening 366 into a longitudinal slot 369 in the block 367. The block is connected by a universal joint 370 to a connecting rod 371 which is connected by a universal joint 372, Fig. 1, to the right hand shear arm 298. The position of the block 367 in the slide opening 366 is controlled by an adjusting screw 373 journalled at 374 in a cap 375 which closes the outer end of the opening 366, Fig. 2. This adjusting screw 373 is screwed into a threaded opening 376 in the block 367. A bevel gear 377 fixed on the adjusting screw 373 is in mesh with a bevel gear 378 operable by a rod 379 which extends to a convenient place for manipulation by an operator of a feeder and is there provided with an operating handle 380. As shown, the operating handle 380 is on a short lug 364a on the shear lever adjacent to the axis of oscillation of such lever and is yieldingly held against unintended turning by a conventional spring-loaded latch 380a. By turning the rod 379, the connecting rod 371 may be moved rectilinearly to adjust the overlap of the shears when they are at the limits of their closing strokes. This adjustment may be effected during operation and while the shears are closed and opened in rapid succession.

Preferably, an air spring mechanism 381, as shown in Fig. 1, is employed to cooperate with the cam 362 in controlling the opening and closing movements of the shear blades. This air spring mechanism comprises a cylinder 382 supported at one end by a universal joint arrangement 383 upon a fixed bracket 384 adjacent to the outer end of the left hand shear arm when the latter is in its open position. A piston 385 is reciprocable in the cylinder 382 and has a projecting rod 386 which is connected by a universal joint arrangement 387 with an outturned knuckle 388 on the left hand shear arm 299 at about the same distance from the hub of the latter as the connection between the connecting rod 371 and the right hand shear arm. Air is supplied to the last-named end of the cylinder 382 by a suitable air line connection, indicated at 389, and a dash-pot arrangement 390 is provided at the opposite end of the cylinder to dampen the movements of the piston 385 in the cylinder and hence the effect of such movements in cooperation with the shear cam 362. Control of the application of air to the cylinder 382 through the connection 389 is by a valve 391, Figs. 2, 3, and 4, as hereinafter explained. The air spring mechanism 381 does not, per se, form part of the present invention, but is disclosed and claimed in the co-pending application of Charles R. Avery, Serial No. 710,967, filed November 20, 1946, entitled "Glass Feeder Shear Mechanism Actuating Means and Method," on which Patent No. 2,472,560 issued on June 7, 1949.

The shears may be thrown out of operation during continued operation of the feeder by a mechanism which is shown in detail in Figs. 2 to 5, inclusive. This mechanism comprises a hook 392 pivoted loosely on an eccentric end portion 393 of a rotary horizontal shaft 394 which is carried by a bracket arm 395 on a fixed part of the feeder framework 396. The hook 392 has an integral tail piece 397 of substantial lateral extent parallel to the shaft 394. The shaft 394 is parallel to the shaft 251 carrying the shear cam 362 and is located at a lower level and at the opposite side of the shear cam roller lever 364, as appears from Fig. 2. The latching hook 392 on the eccentric end portion of the shaft 394 is turned toward the shear cam 362 adjacent to the path of swinging movement of the lever 364 in response to the rotation of the cam 362, the bill of the hook 392 laterally overlapping one side of the lever 364 when the latter has been swung toward the shaft 394 by contact of the roller 363 with a high part of the cam 362. A substantially vertical coil spring 400 is connected at its upper end, as at 401, to the bill of the latching hook 392 and at its lower end, as at 402, to an upstanding lug 403 on a stationary support 404 adjacent to the lever 364. The action of the spring 400 is to tend to pull the bill of the lever 392 downward to position to hook over and engage at 405 with a notched upper end of an upstanding latch post 406 on a horizontal pivot stud 407 carried by the shear lever 364. The post 406 has a base 408 underlying the horizontal pivot element 407 and projecting laterally on opposite sides thereof. Adjustable thrust screws 409 are threaded through the oppositely extending portions of the base 408 against abutment ribs 410 on the shear lever 364 so as to maintain the latching post 406 rigid with the lever while permitting adjustments of the upper end thereof in an arc along the side of the lever toward or away from the axis of the shaft 394.

When the latching hook 392 is permitted to hook over the notched upper end of the post 406, as shown in Fig. 3, the roller 363 on the lever 364 will be retained at the limit of its outward movement by the cam 362 or, in other words, in position to ride on the high portion of the cam 362. This is the latching position of the hook and the hook may be moved thereto from a relatively raised position, as shown in Fig. 4, in which the upper end of the latching post 406 is completely below the bill of the hook and is free to swing with the lever 364 under the bill of the hook toward and from the axis of the cam shaft 251. This is the position of the latching hook when the shears are in operation and the cam roller lever 364 is swinging back and forth as the cam 362 rotates and as required for periodic cutting strokes by the shear blades. The lever 364 is withdrawn further from the cam from the Fig. 3 position by operation of the latch-out mechanism, as to the position shown in Fig. 2, in which the roller 363 is held away from even the highest portion of the cam. This is the latched-out position and is attained by rotary movement of the shaft 394 around its axis from the position shown in Fig. 3 to the position shown in Fig. 2, the eccentric end portion 393 of such shaft then being swung away from the cam so as to act through the latching hook on the latching post 406 and on the shear lever 364 carrying that post.

The movements of the latching hook to the several positions described are effected by an assembly of elements in addition to the spring 400, as now described. This includes the handle 398 having a hub (not shown) on the shaft 394 and extending at the opposite side of the latter from the latching hook 392. Also rotating with the shaft 394 is a relatively short arm 411 which may be integral with a portion of the hub of handle 398 and is formed to provide a holder 412 having a pocket 413 in which is disposed a slidable head 414 of a thrust pin 415 which projects from the pocket 413 beyond one end of the holder 412. A coil spring 416 in the pocket acts continuously on the head 414 to tend to keep the pin 415 fully projected. The location of the arm 411 on the shaft 394 and its shape are such that the thrust pin 415 will contact at its outer end with the tail piece 397 of the latching hook 392 when the handle 398 has been swung from the relatively raised position shown in Fig. 2 to the position shown in Fig. 3 and the pin 415 may be forced partly into the pocket 413 against the pressure of the spring 416 when the handle 398 is moved further in a downward direction from the position shown in Fig. 3 to that of Fig. 4. Movement of the arm 398 from the position shown in Fig. 2 to that shown in Fig. 3 will, of course, be attended by a like angular turning movement of the shaft 394 about its axis and this will return the eccentric end portion 393 of that shaft from the position shown in Fig. 2 to that shown in Fig. 3, thereby allowing the lever 364 to swing from its latched-out position to the latching position at which the roller 363 carried thereby is in a position to contact with the highest portion of the periphery of the cam 362. Movement of the handle 398 from the position shown in Fig. 3 to that shown in Fig. 4 will be attended by a forward rotary movement of the shaft 394 and swinging of the eccentric end portion 393 toward the axis of the cam 362 so as to effect raising of the bill of the latching hook 392 sufficiently to release the latch post 406 and thereby to permit the shear lever to swing free of the latching mechanism as the roller 363 rides on the periphery of the shear cam. A spring detent or dog 417 on a stationary supporting plate 418 will engage with a notch 419 in the periphery of a latching collar 420 on the shaft 394 when the handle 398 is in the relatively raised position shown in Fig. 2. This latching collar 420 has a second notch 421 in its periphery with which the spring dog 417 will engage when the handle is in the latching position shown in Fig. 3. A third notch, indicated at 422, is provided in the periphery of the latching collar 420 so as to be engaged by the dog 417 when the handle 398 is in the shear operating position shown in Fig. 4. The collar 420 may be an integral part of the hub of the handle 398 or it might be a separate member secured to the shaft 394 in any suitable known way. The engagement of the dog with the notches of the periphery of the collar 420 is frictional so as to prevent unintended turning of the handle or of any of the parts moved therewith or actuated thereby to move from any one of the three positions described. The swinging movement of the handle about the axis of the shaft 394 in one direction may be limited by the contact of an adjustable stop 423 with a fixed cooperative abutment 424 as the handle is swung about the axis of the shaft 394. The stop 423 is shown as being mounted on a lug 425 which may be integral with the hub of handle 398. An adjustable vertical stop 426 under the latching hook 392 will limit downward swinging movement of that hook under the pull of the spring 400 during disassambly or assembly of the parts of the mechanism. When assembled, the coaction of the operating parts of the mechanism with the latching hook will determine its angular position about the axis of the eccentric end portion 393 of the shaft 394. The adjustable stop 426 is shown as a screw threaded stud extending through a lug 427 on the supporting bracket arm 395.

The arm 398 carries a cam block 428 fixed to one side thereof in position to contact a pivoted lever 429 for depressing a stem 430 of the normally closed air valve 391 when the arm 398 is swung from the latched-out position shown in Fig. 2 to the latching position of Fig. 3. The cam block 428 will continue in contact with the lever 429 so as to maintain the valve stem 430 depressed during forward swinging movement of the arm 398 from the latching position of Fig. 3 to the operating position shown in Fig. 4. The valve 391 is provided with an air supply pipe 432 and has an outlet portion, indicated at 433, with which the air line 389 is connected. The air line connection 389 supplies air to the cylinder 382, Fig. 1, such cylinder being part of the operating mechanism of the shears as hereinbefore explained. Thus, when the shears are latched out of operation by the shear throw-out mechanism as just described, the normally closed valve 391 will be closed and air will be shut off from the air operated part of the shear operating mechanism. However, when the throw-out mechanism is operated to permit resumption of the operation of the shears, the valve 391 will be opened simultaneously and be kept open while the shears are in operation. This arrangement not only conserves compressed air while the shears are inactive but prevents any unintended actuation of parts thereof by the pressure fluid while the shears are intended to be inactive, thus serving as a safety device to protect an operator while he is changing orifice rings or working in a position which would be dangerous if unintended activity of the shears should be resumed.

A remote control operating mechanism may be provided for turning the shaft 394 at a distance therefrom, as by an operator on the factory floor.

I claim:

1. In a shear mechanism for glass feeding apparatus, a pair of pivoted cooperative shear arms carrying cooperative upper and lower shear blades and mounted to close and open said cooperative blades by swinging movements toward and away from each other, means interconnecting said shear arms to cause them to swing in unison in opposite directions when either is swung about its pivotal axis, a rotating shear cam having an open peripheral cam surface, a cam roll, a cam roll lever pivoted at one end adjacent to the cam and carrying said cam roll in position to bear against the peripheral cam surface of the cam, said lever being swingable about its pivotal axis toward and away from the axis of rotation of its cam and being provided adjacent to its opposite end with a slideway extending in a direction normal to its pivotal axis, a block mounted to slide in said slideway, a connecting rod operatively connected at one end to said block and at its opposite end to one of said shear arms, and means carried by the cam roll lever so as to be operable adjacent to the pivoted end of the lever to adjust said block longitudinally of said slideway to adjust the overlap of the cooperative blades when closed.

2. The combination defined by claim 1 wherein said means to adjust said block along said slideway comprises gearing having a driving connection with said block, an operating rod for operating said gearing, said operating rod and said gearing being mounted on said cam roll lever for movement therewith and said rod having an end portion positioned adjacent to the pivotal axis of the lever so as to minimize the speed and extent of its movements as the lever swings, and a handle on said end of the operating rod operable conveniently by hand to adjust the overlap of the shear blades during operation of the shear mechanism.

3. In a shear mechanism for glass feeding apparatus, the combination with a pair of operatively interconnected pivoted shear arms carrying cooperative shear blades, a rotating shear cam having an open peripheral surface, a cam roll, a cam roll lever pivoted at one end adjacent to the cam and carrying said cam roll in position to bear against said peripheral surface of the cam, and an operating connection between said lever and one of said shear arms, of means to latch the cam roll lever out of operation during continued rotation of the cam comprising a rotary shaft parallel to the axis of rotation of the cam and at the opposite side of the cam roll lever from the cam and adjacent thereto, said shaft having an eccentric end portion, a rigid latching projection on the cam roll lever, a latch-out hook loosely mounted on the eccentric end portion of the shaft to engage with said projection on the cam roll lever when the cam roll is on the high portion of the periphery of its cam and the shaft has been rotated to an angularly predetermined position such as to dispose the hook in a "latching" position, spring means urging said hook into engagement with said latching projection, said hook being adapted to cooperate with said latching projection to pull the cam roll lever to a "latched-out" position clear of the periphery of the cam when the shaft is turned about its axis in one direction from its said angularly predetermined position, hook release means on said shaft turnable therewith to contact and swing the hook clear of the latching projection against the opposition of said spring means when the shaft is turned about its axis in the opposite direction from its said angularly predetermined position, whereby to permit operations of the cam roll lever, and means operable at will to turn said shaft about its axis.

4. In a shear mechanism for glass feeding apparatus, the combination defined by claim 3 wherein said hook release means comprises a short projecting arm on the shaft in fixed angular relation to the eccentric end portion of the shaft, and a spring loaded thrust element carried by said projecting arm in position to contact and exert pressure against a portion of said hook when the shaft is turned about its axis to said angularly predetermined position.

5. In a shear mechanism for glass feeding apparatus, the combination defined by claim 3 and, in addition, an air cylinder having an operating connection to the second of said shear arms for cooperation with the cam actuated means to effect repeated opening and closing of the shear blades, means including a normally closed air valve located adjacent to said rotary shaft to supply operating air to the cylinder, said valve having a normally projected stem adapted when depressed to open said air valve, a pivoted lever for depressing said stem, and cam means carried by said rotary shaft in position to be moved into engagement with said lever to depress said stem and open said valve when said shaft is turned from the "latched-out" position of the hook to the "latching" position thereof and to move out of engagement with said lever to permit closing of the valve when the shaft is turned back to said "latched-out" position, said cam means co-acting with said lever to hold said valve stem depressed and the valve open during rotary movements of the shaft from said "latching" position to position to permit operation of the cam roll lever and back to the "latching" position.

References Cited in the file of this patent

UNITED STATES PATENTS

| Number | Name | Date |
|---|---|---|
| 1,760,435 | Peiler | May 27, 1930 |
| 1,950,339 | Barker, Jr. | Mar. 6, 1934 |
| 2,472,560 | Avery | June 7, 1949 |